United States Patent
Mutambi et al.

(10) Patent No.: US 9,868,860 B2
(45) Date of Patent: Jan. 16, 2018

(54) BISMUTH VANADATE PIGMENTS

(71) Applicant: BASF SE, Ludwigshafen (DE)

(72) Inventors: Emily Mbayisi Mutambi, Ludwigshafen (DE); Aron Wosylus, Bad Dürkheim (DE); Christof Kujat, Neustadt (DE); Georg Josef Döring, Mannheim (DE); Philipp Raff, Ludwigshafen (DE)

(73) Assignee: BASF SE (DE)

( * ) Notice: Subject to any disclaimer, the term of this patent is extended or adjusted under 35 U.S.C. 154(b) by 0 days.

(21) Appl. No.: 14/907,129

(22) PCT Filed: Jul. 22, 2014

(86) PCT No.: PCT/IB2014/063299
§ 371 (c)(1),
(2) Date: Jan. 22, 2016

(87) PCT Pub. No.: WO2015/011639
PCT Pub. Date: Jan. 29, 2015

(65) Prior Publication Data
US 2016/0160051 A1     Jun. 9, 2016

(30) Foreign Application Priority Data

Jul. 25, 2013 (EP) ................ 13177986

(51) Int. Cl.
| | |
|---|---|
| *C09D 11/322* | (2014.01) |
| *C09D 11/037* | (2014.01) |
| *C09C 1/00* | (2006.01) |
| *C01G 29/00* | (2006.01) |
| *C01G 31/00* | (2006.01) |

(52) U.S. Cl.
CPC .......... *C09C 1/0006* (2013.01); *C01G 31/006* (2013.01); *C01P 2002/50* (2013.01); *C01P 2004/62* (2013.01); *C01P 2006/62* (2013.01); *C01P 2006/65* (2013.01); *C01P 2006/66* (2013.01)

(58) Field of Classification Search
CPC ... C09D 11/037; C09D 11/322; C09C 1/0006; C01G 29/006; C01G 31/006; C01P 2004/62
USPC ............ 106/31.6, 31.9, 451, 462, 479
See application file for complete search history.

(56) References Cited

U.S. PATENT DOCUMENTS

| | | | |
|---|---|---|---|
| 4,230,500 A * | 10/1980 | Balducci | ........... C09C 1/40 106/479 |
| 5,034,430 A | 7/1991 | Babler | |
| 5,123,965 A | 6/1992 | Herren et al. | |
| 5,186,748 A | 2/1993 | Erkens et al. | |
| 5,273,577 A | 12/1993 | Liedek et al. | |
| 5,336,312 A | 8/1994 | Byrne et al. | |
| 5,399,197 A * | 3/1995 | Vermoortele | ......... C09C 1/0006 106/479 |
| 5,536,309 A | 7/1996 | Etzrodt et al. | |
| 5,753,028 A | 5/1998 | Ochmann et al. | |
| 5,853,472 A | 12/1998 | Erkens et al. | |
| 5,858,080 A | 1/1999 | Bugnon | |
| 5,958,126 A | 9/1999 | Adel et al. | |
| 6,423,131 B1 | 7/2002 | Seeger et al. | |
| 6,444,025 B1 | 9/2002 | Erkens et al. | |
| 9,062,216 B2 | 6/2015 | Boocock et al. | |
| 2008/0127860 A1 | 6/2008 | Bramnik et al. | |
| 2011/0198530 A1 | 8/2011 | Roy | |

FOREIGN PATENT DOCUMENTS

| | | |
|---|---|---|
| CN | 1939981 A | 4/2007 |
| CN | 101107331 A | 1/2008 |
| EP | 0810269 A2 | 12/1997 |
| EP | 984044 | 3/2000 |
| IT | 1243945 B | 6/1994 |
| WO | WO-2014/160218 A2 | 10/2014 |

OTHER PUBLICATIONS

International Search Report for PCT/IB2014/063299 dated Jan. 9, 2015.
European Search Report for European Application No. EP13177986 dated Jan. 13, 2014.

* cited by examiner

*Primary Examiner* — Helene Klemanski
(74) *Attorney, Agent, or Firm* — Drinker Biddle & Reath LLP

(57) ABSTRACT

A bismuth vanadate pigment is provided which pigment is doped with a combination of Mg, Al and P and optionally an element E, wherein the molar ratios of the Bi, V, Mg, Al, P and E correspond to a formula $$Bi\ Mg_a\ Al_b\ E_c\ V_d\ P_e\ O_f \qquad (I)$$

wherein E is selected from the group consisting of Be, Ca, Sr, Ba, Zr, Mo, Ce and a combination thereof; $0.001 \le a \le 0.2$; $0.001 \le b \le 0.2$; $0 \le c \le 1.7$; $0.5 \le d \le 2.3$; $0.001 \le e \le 0.5$; and f denotes the number of oxygen atoms for satisfying the valence requirements of the cations. The pigment may be used as colorant in various applications, especially in coloring high molecular weight organic material, for example, coating compositions, paints, printing inks, liquid inks, plastics, films, fibers, or glazes for ceramics or glass.

19 Claims, No Drawings

BISMUTH VANADATE PIGMENTS

CROSS-REFERENCE TO RELATED APPLICATIONS

This application is a national stage application (under 35 U.S.C. §371) of PCT/IB2014/063299, filed Jul. 22, 2014, which claims benefit of European Application No. 13177986.0, filed Jul. 25, 2013, both of which are incorporated herein by reference in their entirety.

The present invention relates to a bismuth vanadate pigment doped with a combination of phosphorous, magnesium and aluminum and optionally one or more further elements, a process for manufacturing the same and the use thereof as a colorant in various applications, especially in coloring high molecular weight organic material, for example, coating compositions, paints, printing inks, liquid inks, plastics, films, fibers, glazes for ceramics and glass.

Lead chromate pigments are often used when yellow colorations of good performance properties are desired. However, the use of chromate-containing pigments and lead-containing pigments is decreasing due to environmental restrictions and requirements.

Bismuth vanadate pigments are well known as suitable yellow pigments. As well as pure $BiVO_4$ pigments, there are a number of $BiVO_4$ pigments in which some of the metal and/or oxygen atoms are replaced by other metals and/or non-metals. In particular, they are highly valued because of their low toxicity and their good coloristic properties in different applications like coatings, printing inks and plastics.

In order to improve their performance characteristics, especially their thermal stability, weather fastness and resistance to chemicals, bismuth vanadate pigments are frequently provided with stabilizing coatings of, for example, metal phosphates, metal fluorides and/or metal oxides including silicates. Usually, such coatings are non-porous and continuous and are produced by precipitating phosphates, oxides or hydroxides and fluorides from preferably aqueous solutions of soluble salts of the corresponding metals. Bismuth vanadate pigments comprising at least one coating containing calcium fluoride, bismuth oxyfluoride or lanthanide fluoride or oxyfluoride are known from EP-A-0984044. The coated pigments are described to achieve a better chroma C* than uncoated pigments (according to the L*C*h system of the Commision Internationale de l'Eclairage). U.S. Pat. No. 5,958,126 discloses a stabilizing effect provided by a combined coating of aluminum hydroxide, calcium hydroxide and zinc phosphate onto a bismuth vanadate pigment. According to U.S. Pat. No. 5,858,080 C.I. Pigment Yellow 184, the particle surface of which is coated with a polyvinyl alcohol, shows better values of tinctorial strength, chroma and gloss compared to an uncoated pigment.

U.S. Pat. No. 5,753,028 discloses Fe-containing bismuth vanadate pigments of reddish yellow shade, the color space of which is, however, limited to lightness values L* of less than 78, to color angles (hue) of from 78-85 and to chroma values C* of from 85-93. Such pigment shows undesired magnetism. A stabilization step after forming the pigment is described by applying salt solutions of calcium and aluminum nitrate and phosphoric acid.

U.S. Pat. No. 5,536,309 discloses a bismuth vanadate pigment doped with various element combinations. For example, a pigment doped with either P, Ca and Zn or P, Si and Zn is described. These pigments are prepared by adding the doping materials during the preparation process, optionally zinc hexafluorosilicate may be added to the reaction mixture in stages. Chroma values of below 100 are mentioned.

U.S. Pat. No. 5,123,965 discloses a process for stabilizing bismuth vanadate pigments against attack by hydrochloric acid by treating a pure bismuth vanadate pigment or a $(Bi,Ca)(V,Mo)O_4$ pigment with 2-20 wt. % of metal orthophosphate selected from Ca, Mg, Al, Zr or Ti, or a mixture thereof or with zinc orthophosphate.

U.S. Pat. No. 5,186,748 discloses a process for the preparation of $(Bi,A)(V,Mo)O_4$, wherein A may be Ca, Mg, Sr and/or Zn, using a fluoride during the admixing step of the precursor solution and/or the aftertreatment step of converting the amorphous form into the crystalline form. However, molybdenum has an adverse effect on stability with respect to photochromism.

Hence, there is a need for bismuth vanadate pigments having improved coloristics and performance properties, like high hiding power, high chrome and/or excellent weather fastness, especially a high chroma.

Therefore, it is an object of the present invention to provide a bismuth vanadate pigment exhibiting the desired coloristics, especially high chroma, high color strength and/or high hiding power combined with outstanding performance properties like weather resistance in various applications.

A bismuth vanadate pigment has been found which exhibits the desired performance characteristics of good weather resistance and color properties. The pigment does only comprise elements free from toxicological concern.

Accordingly, in a first aspect the invention relates to a bismuth vanadate pigment which is doped with a combination of Mg, Al and P and optionally an element E, wherein the molar ratios of the Bi, V, Mg, Al, P and E correspond to a formula $$Bi\ Mg_a\ Al_b\ E_c\ V_d\ P_e\ O_f \qquad (I)$$

wherein E is selected from the group consisting of Ca, Sr, Ba, Zr, Mo, Ce and a combination thereof;

0.001≤a≤0.2;
0.001≤b≤0.2;
0≤c≤1.7;
0.5≤d≤2.3;
0.001≤e≤0.5; and
f denotes the number of oxygen atoms for satisfying the valence requirements of the cations.

In a further aspect, the invention relates to a process for manufacturing a bismuth vanadate pigment of formula (I) as defined herein-before, which process comprises the steps of a) treating an alkaline vanadate solution with an acidic bismuth salt solution in the presence of soluble salts of magnesium and aluminium and soluble phosphates in a pH range of from 0.1 to 10 to form a precipitate;
b) calcining the precipitate; and
c) grinding the calcined product to form pigment particles.

Further, the invention relates to the use of the pigment as defined herein-before for coloring a coating composition, a paint, a printing ink, a liquid ink, plastics, a film, a fiber, or a glaze for ceramics glass.

Further, a coating composition, a paint, a printing ink, a liquid ink, plastics, a film, a fiber, or a glaze for ceramics or glass is provided, which is colored with a pigment as defined herein-before.

Further, a process for coloring a coating compositions, a paint, a printing ink, a liquid ink, plastics, a film, a fiber, or a glaze for ceramics and glass is provided, which process comprises adding thereto a pigment as defined hereinbefore.

The term C* (chroma) used herein means the chroma in the L*C*h color space (also referred to as CIELAB) specified by the Commission Internationale de l'Eclairage, wherein L* is the lightness and h is the hue angle. The L* value is normally measured at an observation angle of 45°.

A combination of Ca, Sr, Ba, Zr, Mo and Ce means any possible combination of two or more metals, preferably two, three or four metals.

Preferably, the variable a is $0.001 \leq a \leq 0.15$, and more preferably $0.005 \leq a \leq 0.12$.

Preferably, the variable b is $0.001 \leq b \leq 0.15$, and more preferably $0.005 \leq b \leq 0.12$.

Preferably, the variable c is $0.001 \leq c \leq 1.7$, more preferably $0.001 \leq c \leq 1.5$, and most preferably $0.01 \leq c \leq 1.5$.

Preferably, the variable d is $0.8 \leq d \leq 2.3$, and more preferably $0.85 \leq d \leq 2.2$.

Preferably, the variable e is $0.001 \leq e \leq 0.4$, and more preferably $0.01 \leq e \leq 0.4$.

In a preferred aspect, the pigment is of formula (I), wherein
$0.001 \leq a \leq 15$; $0.001 \leq b \leq 0.15$; $0 \leq c \leq 1.5$; $0.8 \leq d \leq 2.3$; and $0.01 \leq e \leq 5\ 0.4$.

Optionally, further dopants may be present which are preferably at least one of Ca, Zr, Mo or Ce or any combination of two, three or four metals, for example Ca; Ce; Zr; Ca and Zr; Zr and Ce; Ca and Ce; Ca, Zr and Ce; Zr and Mo; or Ca, Zr and Mo.

Accordingly, more preferred is a pigment of formula (I), wherein E is selected from the group consisting of Ca, Zr, Mo, Ce and a combination thereof; and $0.001 \leq c \leq 1.7$; preferably $0.001 \leq c \leq 1.5$, more preferably $0.01 \leq c \leq 1.5$.

Where E is selected from the group consisting of Ca, Zr, Mo and a combination thereof, the variables c and d are preferably the following:
$0.001 \leq c \leq 0.5$ and $0.8 \leq d \leq 1.5$; more preferably $0.01 \leq c \leq 0.5$ and $0.8 \leq d \leq 1.5$.

A further preferred pigment of formula (I) is a pigment, wherein E is selected from the following combinations: Ca and Zr; Zr and Ce; Ca and Ce; Ca, Zr and Ce; Zr and Mo; or Ca, Zr and Mo;
$0.001 \leq a \leq 0.15$; $0.001 \leq b \leq 0.001 \leq c \leq d \leq 1.5$; $0.8 \leq d \leq 2.3$; and $0.01 \leq e \leq 0.4$; preferably $0.01 \leq c \leq 1.5$.

Advantageously, the pigment is a pigment of formula (I), wherein E is Ca and/or Zr, and $0.001 \leq c \leq 0.5$, preferably $0.01 \leq c \leq 0.5$, more preferably $0.01 \leq c \leq 0.4$.

Thus, a preferred pigment is a pigment of formula (I), wherein E is Ca;
$0.001 \leq a \leq 0.15$; $0.001 \leq b \leq 0.15$; $0.001 \leq c \leq 0.5$; $0.8 \leq d \leq 1.5$; and $0.01 \leq e \leq 0.4$; preferably $0.01 \leq c \leq 0.4$.

A further preferred pigment is a pigment of formula (I), wherein E is Zr;
$0.001 \leq a \leq 0.15$; $0.001 \leq b \leq 0.15$; $0.001 \leq c \leq 0.5$; $0.8 \leq d \leq 1.5$; and $0.01 \leq e \leq 0.4$;
preferably $0.01 \leq c \leq 0.5$, more preferably $0.01 \leq c \leq 0.4$.

A further preferred pigment is a pigment of formula (I), wherein E is Ca and Zr;
$0.001 \leq a \leq 0.15$; $0.001 \leq b \leq 0.15$; $0.01 \leq c \leq 0.5$; $0.8 \leq d \leq 1.5$; and $0.01 \leq e \leq 0.4$.

A further preferred pigment is a pigment of formula (I), wherein E is Zr and Mo;
$0.001 \leq a \leq 0.15$; $0.001 \leq b \leq 0.15$; $0.01 \leq c \leq 0.5$; $0.8 \leq d \leq 1.5$; and $0.01 \leq e \leq 0.4$.

A further preferred pigment is a pigment of formula (I), wherein E is Ce, or a combination of Zr and Ce, or a combination of Ca and Ce;
$0.001 \leq a \leq 0.15$; $0.001 \leq c \leq 0.15$; $0.01 \leq c \leq 1.5$; $0.8 \leq d \leq 2.3$; and $0.01 \leq e \leq 0.4$.

Where E is Ce, a pigment of formula (I) is preferred, wherein $0.01 \leq c \leq 1.3$; preferably $0.1 \leq c \leq 1.2$; more preferably $0.5 \leq c \leq 1.2$.

A further preferred pigment is a pigment of formula (I), wherein E is a combination of Ca, Zr and Ce;
$0.001 \leq a \leq 0.15$; $0.001 \leq b \leq 0.15$; $0.01 \leq c \leq 1.5$; $0.8 \leq d \leq 2.3$; and $0.01 \leq e \leq 0.4$.

A further preferred pigment is a pigment of formula (I), wherein E is a combination of Ca, Zr and Mo;
$0.001 \leq a \leq 0.15$; $0.001 \leq b \leq 0.15$; $0.01 \leq c \leq 0.5$; $0.8 \leq d \leq 1.5$; and $0.01 \leq e \leq 0.4$.

A further preferred pigment is a pigment of formula (I), wherein $c=0$; $0.001 \leq a \leq 0.15$; $0.001 \leq b \leq 0.15$; $0.8 \leq d \leq 1.5$; and $0.01 \leq e \leq 0.4$.

The variables a, b, c, d and e correspond to the molar ratios of the elements comprised in the pigment of formula (I) of the invention.

As described above the variable f denotes the number of oxygen atoms for satisfying the valence requirements of the cations. The molar ratio of bismuth to oxygen may be of from 1:3 to 1:4.5, preferably 1:3.2 to 1:4.3.

Within the embodiments comprising a combination of elements E, the elements may be used in any ratio to each other.

Where E is a combination of Ca and Zr, the molar ratio of Ca to Zr is preferably of from 0.01:0.09 to 0.4:0.6, more preferably 0.1:0.9 to 0.4:0.6.

Where E is a combination of Mo and Zr, the molar ratio of Mo to Zr is preferably of from 0.01:0.09 to 0.5:0.5, more preferably 0.1:0.9 to 0.5:0.5.

Where E is a combination of Ce and Zr, the molar ratio of Ce to Zr is preferably of from 0.5:0.5 to 0.99:0.01, more preferably 0.7:0.2 to 0.95:0.05.

Where E is a combination of Ce and Ca, the molar ratio of Ce to Ca is preferably of from 0.7:0.3 to 0.99:0.01, more preferably 0.8:0.2 to 0.95:0.05.

Where E is a combination of Ca, Zr and Ce, the molar ratio of Ca to Zr to Ce is preferably of from 0.05:0.05:0.9 to 0.1:0.3:0.6, more preferably 0.05:0.1:0.85 to 0.09:0.1; 0.81.

Where E is a combination of Ca, Zr and Mo, the molar ratio of Ca to Zr to Mo is preferably of from 0.05:0.7:0.25 to 0.2:0.35:0.45, more preferably 0.05:0.65:0.3 to 0.15:0.35: 0.5.

Within the pigment of formula (I) the dopants may replace sites of bismuth and/or vanadium.

Bismuth is generally present as Bi(III). Vanadium is generally present as V(V). The invention also provides a pigment where vanadium is present as V(V) and V(IV). V(IV) may be introduced into the pigment of the invention by adding a suitable V(IV) salt. For example, vanadium (IV) oxy sulfate may be used in the process for the preparation of the pigments of the invention.

The molar amount of V(IV) may be up to 0.3 mol %, based on 1 mol vanadium.

Accordingly, in a preferred aspect the invention relates to a pigment of formula (I), wherein vanadium is present as V(V) and V(IV). The molar ratio of V(V):V(IV) may be of from 1: 0.01 to 1:0.3, preferably 1:0.05 to 1:0.25.

V(IV) may be present in any pigments of formula (I), preferably in combination with Zr or in combination with Ca and Zr or in combination with Zr and Mo or in combination with Zr, Mo and Ca. It is also preferred that V(IV) is present in a pigment of formula (I), wherein c is 0.

The composition of the pigment particles may differ between inside and outside. The formula (I) should therefore be considered as the average composition for the pigment as a whole.

Pigments of formula (I) comprising Zr or a combination of Zr and Mo are distinguished by a significantly high color strength and/or hiding power, especially compared to bismuth vanadate pigments of the prior art or bismuth vanadate pigments without such elements.

Accordingly, the invention relates to the use of Zr, or Zr and Mo as dopant(s) in bismuth vanadate pigments to enhance the color strength and/or hiding power. Bismuth vanadate pigments may be pure bismuth vanadate or bismuth vanadate pigments doped with elements other than Zr and Mo.

Pigments of formula (I) comprising V(IV) or a combination of V(IV) and Zr are distinguished by a significantly high hiding power, especially compared to bismuth vanadate pigments of the prior art or bismuth vanadate pigments without such elements.

Accordingly, the invention relates to the use of V(IV), or V(IV) and Zr as dopant(s) in bismuth vanadate pigments to enhance the hiding power. Bismuth vanadate pigments may be pure bismuth vanadate or bismuth vanadate pigments doped with elements other than V(IV) and Zr.

The pigments of the invention are advantageously prepared by a process comprising a wet-chemical precipitation process, wherein a precipitate is formed by mixing appropriate precursor solutions at a suitable pH in the presence of the desired dopants, and a calcination step of the formed precipitate.

In a further aspect, the invention relates to a process for manufacturing a bismuth vanadate pigment of formula (I) as defined in any aspect herein-before, which process comprises the steps of a) treating an alkaline vanadate solution with an acidic bismuth salt solution in the presence of soluble salts of magnesium and aluminium and soluble phosphates in a pH range of from 0.1 to 10 to form a precipitate;

b) calcining the precipitate; and c) grinding the calcined product to form pigment particles.

Optionally, soluble salts of further dopants may be added in step a), preferably as aqueous solutions. The sequence in which the salts are mixed with one another is generally immaterial. Stirring is usually carried out during step a).

Thus, the invention relates to a process of manufacturing a bismuth vanadate pigment of formula (I) as defined in any aspect herein-before, which process comprises the steps of a) treating an alkaline vanadate solution with an acidic bismuth salt solution in the presence of soluble salts of Mg, Al, and optionally of E and/or V(IV), and soluble phosphates in a pH range of from 0.1 to 10 to form a precipitate, b) calcining the precipitate, and c) grinding to form pigment particles.

In general, step a) involves mixing an alkaline vanadate solution with an acidic bismuth salt solution in the presence of soluble salts of magnesium and aluminum and soluble phosphates and optionally soluble salts of further dopants. The alkaline vanadate solution containing phosphate may be used as initial charge, and the acidic bismuth salt solution is added thereto, followed by adding solutions containing magnesium and aluminum salts and optional other solutions of dopants. Dopants like Zr may also be present in the vanadate solution. Dopants like Ce may be present in the bismuth salt solution. Usually, the acidic bismuth nitrate solution contains nitric acid and has a pH between 0.1 and 3. The solutions may be mixed at a temperature of from 5 to 30° C., preferably 7 to 25° C.

Generally, the precipitation reaction takes place while the pH is suitably adjusted to a range of from 0.1 to 10, in general using a base and an acid. At the end of precipitation, the pH is usually in the range of from 3 to 6, preferably 3 to 5. The reaction time for step a) may vary according to the batch size, generally of from about 4 min to 120 min.

Usually, an oxidizing agent is added to the mixture when all components are combined, for example, a peroxo salt of alkali metals such as sodium and potassium, especially sodium perborate, or hydrogen peroxide.

The mixture may usually be heated up to reflux temperature, while keeping the pH constant in the range of from 3 to 6, preferably 3 to 5. In order to keep the pH constant a base may be continuously added as long as the pH keeps on dropping and the mixture should be stirred at the elevated temperature until the pH remains constant on its own. This takes generally 0.5 to 5 hours.

The resulting precipitate may be isolated in a conventional manner, for example, by filtration or centrifugation, washing salt-free, and optionally drying and subjecting to deagglommeration, for example, in a Brown mixer.

Prior to calcination the precipitated product may be ground in dry or wet state, preferably in aqueous suspension so that the preceding drying step may be omitted.

The precipitated product is then calcined, and the calcined product is ground to obtain the particle size suitable for the application as a pigment.

Suitable soluble precursor compounds used for precipitating the bismuth vanadate solid are, for example, the following salts:

ammonium and alkali metal meta-, ortho- or polyvanadates, especially potassium or sodium metavanadate;

alkali metal phosphates or hydrogen phosphates such as potassium or sodium phosphate, or preferably phosphoric acid;

bismuth(III) nitrate or bismuth acetate, especially bismuth nitrate;

magnesium hydroxide or magnesium oxide; and aluminum nitrate.

Suitable soluble precursor compounds of the optional dopants may be the following:

calcium hydroxide or calcium nitrate;

zirconium oxy nitrate or zirconium(IV)sulfate;

cerium carbonate;

vanadium(IV) oxide sulphate;

alkali metal or ammonium molybdate, especially sodium or potassium molybdate.

Suitable bases are inorganic bases such as an aqueous sodium or potassium hydroxide solution, for example, 5 to 50% strength by weight, and an aqueous sodium carbonate solution, for example, 5 to 30% strength by weight. A suitable acid is, for example, nitric acid, usually 65% strength by weight.

The precursor solutions are usually used in amounts which substantially correspond to the desired stoichiometry to obtain the desired molar ratios, often in a suitable excess. Phosphoric acid may generally be used in excess.

The upper concentrations limits of the salt solutions mentioned above are, in general, determined by the solubility of the salts used, although it is advantageous to use diluted solutions. The concentrations of the salt solutions are usually of from 0.001 to 50% by weight and preferably 0.01 to 30% by weight.

The molar ratio of bismuth salt to magnesium salt is generally in the range of from 1:0.001 to 1:0.3, preferably 1:0.001 to 1:0.25.

The molar ratio of bismuth salt to aluminum salt is generally in the range of from 1:0.001 to 1:0.3, preferably 1:0.001 to 1:0.25.

The molar ratio of bismuth salt to vanadium salt is generally in the range of from 1:0.5 to 1:2.5.

The molar ratio of bismuth salt to phosphate is generally in the range of from 1:0.001 to 1:0.7, preferably 1:0.01 to 1:0.56.

When d is greater 0, the molar ratio of bismuth salt to the salt comprising E is generally adjusted such to obtain the desired doping ratio, usually in a slight excess of up to 10% by weight.

Drying of the precipitate or the final product may be carried out for about one hour to about 48 hours and especially from 5 to 20 hours. Suitable drying apparatuses such as spray dryers, through-circulation drying oven are generally known.

Calcining may be done under any atmosphere, preferably under inert gas atmosphere or an oxidizing atmosphere like air. Suitable calcination temperatures range from 400 to 700° C., preferably from 400 to 600° C. The calcination time generally ranges from 0.5 to 4 hours. The calcination product may be gradually or continuously cooled down to room temperature. The cooling time may be for 1 to 10 hours.

The product may be worked up by grinding to form pigment particles, for example, by wet-milling in a ball mill, pearl mill or sand mill, and drying. Optionally, the final pigment may be dry-milled and/or subjected to deagglomeration.

The particle size of the instant pigments may be of from 0.4 to 3 μm, preferably 0.5 to 2 and more preferably 0.5 to 1.4 μm. The particle size may be measured according to DIN 13320.

In a further aspect, the invention relates to a pigment obtainable by the process as defined herein-before. Accordingly, the invention relates to a bismuth vanadate pigment of formula (I) obtainable by a process, which process comprises the steps of a) treating an alkaline vanadate solution with an acidic bismuth salt solution in the presence of soluble salts of Mg, Al, and optionally of E and/or V(IV), and soluble phosphates in a pH range of from 0.1 to 10 to form a precipitate, b) calcining the precipitate, and c) grinding to form pigment particles.

Usually, the pigments of the invention, especially those doped with at least Mg, Al and Ca, are sufficiently stable with respect to heat, light or chemical resistance. It is therefore not necessary to subject the pigments of the invention to a further stabilizing treatment, for example, to coating with an inorganic or organic layer. However, if desired, the pigments may be treated in such a way. The layers may be effected by single- or multistage precipitation onto the pigments, for example, of aluminum, titanium, antimony, cerium, calcium, zirconium or silicon compounds, of zinc phosphate or mixtures thereof. They customarily account for from 2 to 40, preferably 2 to 20, more preferably from 3 to 15% by weight, based on the total weight of the pigment.

Preferably, the pigment of the invention does not contain an additional layer which is generally applied after calcination.

The pigments of the invention may be employed diversely as colorants. They may be used in various high molecular weight material, especially high molecular weight organic material. Preferred fields of use of the pigments are as colorants for coloring paints, printing inks, liquid inks, plastics, rubber, fibers and films. Paints are aqueous or solvent-borne coating materials and also powder coating materials, in which the pigments of the invention may be employed alone or in combination with extenders, white pigments, chromatic pigments or black pigments. Binders that may be used include all of the binders that are usual in the coatings sector. Examples of coating materials which may be colored with the pigments of the invention include more particularly:

oil-based coating materials (based on linseed oil or polyurethane oils), cellulose-based coating materials (NC, CAB, CAP), coating materials based on chlorinated rubber, vinyl coating materials (based on PVC, PVDF, VC copolymer, polyvinyl acetate, polyvinyl ester dispersion, polyvinyl alcohol, polyvinyl acetal, polyvinyl ether, polystyrene, styrene copolymers), acrylate coating materials, alkyd coating materials, saturated polyester coating materials, unsaturated polyester coating materials, polyurethane coating materials (one pack, two pack), epoxy coating materials, silicone coating materials, silicate coating materials (based on waterglass, alkyl silicates).

These coating systems are described in detail in D. Stoye, W. Freitag, Paints, Coatings and Solvents, Second Edition, 1998, Wiley-VCH.

Combinations with effect pigments are also possible and lead to special effects. Effect pigments include platelet-shaped metallic and/or oxidic effect pigments, generally known in the art.

The pigments of the invention may also advantageously be used to color customary plastics and blends of plastics, either as pigments alone or in combination with white, chromatic, and black pigments, and in combination with all typical additives and stabilizers. Suitable plastics include unplasticized and plasticized PVC, polyolefins, and also all engineering plastics such as ABS, polystyrene, polyamide, polyester, polycarbonate, polyetherketone, and also polyurethanes and rubber systems. The pigments can be incorporated by means of typical mixing, blending, kneading and extrusion techniques.

The pigments may be used in an amount of from 0.01 to 75% by weight, preferably 0.01 to 50% by weight, based on the total weight of the material to be colored.

In a further aspect, the invention relates to the use of the pigment as defined in any aspect herein-before for coloring or pigmenting a coating composition, a paint, a printing ink, a liquid ink, plastics, a film, a fiber, or a glaze for ceramics and glass. The coating composition may be an automotive, decorative or industrial coating composition or a paint. Preferably, the pigment is used as a colorant for an automotive, decorative, industrial coating composition, a paint or plastics.

In a further aspect, the invention relates to a coating composition, a paint, a printing ink, a liquid ink, plastics, a film, a fiber, or a glaze for ceramics and glass, which is colored or pigmented with a pigment as defined in any aspect herein-before.

In a further aspect, the invention relates to a process for coloring or pigmenting a coating composition, paint, a printing ink, a liquid ink, plastics, a film, a fiber, or a glaze for ceramics and glass, which process comprises adding thereto a pigment as defined in any aspect herein-before.

The yellow pigments are characterized by excellent performance properties, like outstanding hiding power, high chroma and excellent weather fastness. They are therefore highly useful to replace the undesirable lead chromate pigments in the yellow color spectrum.

The pigments are chemically inert and highly weather- and temperature-resistant, so making them equally suitable for interior and exterior applications. The colorations obtained are distinguished especially by high purity of color shade and high color strength.

Pigments of formula (I) comprising Zr or a combination of Zr and Mo as dopant(s) are distinguished by a significantly high color strength and/or hiding power, especially compared to bismuth vanadate pigments of the prior art or bismuth vanadate pigments without such elements.

Pigments of formula (I) comprising V(IV) or a combination of V(IV) and Zr are distinguished by a significantly high hiding power, especially compared to bismuth vanadate pigments of the prior art or bismuth vanadate pigments without such elements.

Moreover, the hue of bismuth vanadate of formula (I) may be shifted into the red color space when V(IV) is present. Such pigments are distinguished by a reddish yellow hue and simultaneously high chroma compared to red-tinged bismuth vanadate pigments of the prior art which often are too dull and weak in color.

The definitions and preferences given for the pigment mentioned herein-before apply in any combination as well as in any combination for the other aspects of the invention.

The present invention will now be explained in more detail with reference to the following examples. However, the following examples are provided for illustrative purposes only, and the scope of the present invention should not be limited thereto in any manner. Unless otherwise stated, "%" is always % by weight.

EXAMPLES

The colorimetric assessment is assessed on coating films prepared as follows. A mixture of 24.6 g of each pigment and 75.4 g of an hydroxyl functional acrylic resin is shaken on a Skandex machine for 120 min with 150 g of glass beads (3 mm in diameter), then hidingly applied to a chromated aluminum sheet, flashed off and heated at 80° C. for 2 hours.

The weather fastnesses are evaluated in the mass tone by means of accelerated weathering for 114 days in a Xenon test 1200 without turnaround run (from Atlas) in accordance with DIN EN ISO 11341. The evaluation is undertaken in accordance with DIN EN 20105-A02 (gray scale for assessing change in color). The assessment scale ranges from 0 (miserable weather fastness) to 5 (excellent weather fastness).

To determine the CIELAB values of hue h [°], chrome $C^*$ and lightness $L^*$, the coating films obtained (in masstone) are measured. Evaluation takes place on the data obtained at a measurement angle of 45°.

The color strength is determined in white reduction, consisting of 1 part of the instant bismuth vanadate pigment+3 parts of rutile Kronos 2310 using the above-mentioned spectrophotometer. For white reductions the millbase is mixed with a white enamel ($TiO_2$ 20% by weight in acrylic resin) in a ratio of 1 to 5 (pigment/$TiO_2$), then mixed with a polyisocyanate (75% solution) in a ratio of 1.96 to 1 (resin/isocyanate) and also hidingly applied to a chromated aluminum sheet, flashed off and heated at 80° C. for 2 hours.

The values obtained are shown in Table 1.

Example 1

A mixture of 1000 g of water, 297 g of an aqueous sodium vanadate solution (7 wt. % of V), 16 g of nitric acid (65 wt. % strength) and 7 g of phosphoric acid (85 wt. % strength) is provided with stirring. The temperature of said mixture is kept below 10° C., and the pH is kept above 9 by adding an aqueous solution of sodium carbonate (15 wt. % strength) with stirring within 10 min. 350 g of an acidic bismuth nitrate solution (23.75 wt. % of Bi) are added within 60 min. The pH of the mixture is then adjusted to 4.5 within 1 hour by adding a sodium hydroxide solution (5 wt. % strength) and subsequently nitric acid (65 wt. %).

Solutions of 2 g of $Ca(OH)_2$ (≥96%) in 33 g of water and 0.4 g of MgO (100%) in 24 g of water are added to the suspension within 15 min while stirring. The pH is increased to above 4 using NaOH (25 wt. %) within 90 min and is then kept above 4.6 using NaOH (5 wt. %). This is followed by adding 4 g of $Al(NO_3)_3.9H_2O$ (98%) in 33 g of water and a solution of 7 g of sodium perborate (97%) in 29 g of water while the pH is kept below 5 using NaOH (5 wt. % strength) and $HNO_3$ (65 wt. %). The resulting suspension is then heated to a temperature of 95° C. while maintaining pH 4.7. After about 40 min, the suspension turns deep yellow, and the pH briskly rises to 7.5. The suspension is stirred at 95° C. to a constant pH. After cooling to room temperature, the product is filtered off, washed salt-free and dried at 110° C. in a through-circulation drying oven. The thus obtained product is wet-milled to a particle size of about 1 μm, filtered, washed and dried followed by heat-treating the product at 550° C. for 1 hour, wet-grinding in water to an average particle size of about 0.8 μm and drying at 110° C.

Example 2

295 g of $NaVO_3$ (7 wt. % of V) are suspended in 840 g of water, and the suspension is stirred for 30 min, followed by adding 16 g of $HNO_3$ (65 wt. %) with ice cooling to give a pH below 9. 7 g of $H_3PO_4$ (85 wt. %) are added within 5 min at a temperature below 8° C. 350 g of an acidic bismuth nitrate solution (23.75 wt. % of Bi) are added within 60 min while the pH drops to 0.5, and the pH is adjusted to greater than 4 using 150 g of $Na_2CO_3$ (15 wt. %) within 90 min to obtain a beige suspension.

A solution of 1.8 g of $Ca(OH)_2$ (a 96%) in 24 g of water and a solution of 0.4 g of MgO (100%) in 34 g of water are added to the suspension within 15 min resulting in pH 0.5. The pH is increased to above 4 using 170 g of NaOH (25 wt. %) within 90 min and is then kept above 4.6 using NaOH (5 wt. %).

A solution of 4 g of $Al(NO_3)_3.9H_2O$ (98%) in 33 g of water and a solution of 7 g of sodium perborate (97%) in 29 g of water are then added. The resulting mixture is heated at 95° C. for 80 min to a constant pH and then cooled to room temperature. The product is filtered, washed and wet-milled to a particle size of about 1.5 μm, dried at 110° C. for 1 hour and then calcined at 550° C. The product is again wet-milled in water to a final particle size of about 0.7 μm.

Example 3

A mixture of 1000 g of water, 295 g of an aqueous sodium vanadate solution (7 wt. % of V), 16 g of nitric acid (65 wt. %) and 4 g of phosphoric acid (85 wt. %) is provided with stirring and cooling. The temperature of said mixture is kept below 10° C. and the pH is kept at 8.7 by adding an aqueous solution of sodium carbonate (15 wt. %) with stirring within 10 min. 352 g of an acidic solution of bismuth nitrate (23.75 wt. % of Bi) are added within 60 min. The pH of the mixture is then adjusted to 4.5 within 1 hour with an aqueous solution of sodium hydroxide (5 wt. %) and nitric acid (65 wt. %). 0.8 g of calcium hydroxide (≥96%) and 0.2 g of magnesium hydroxide (as aqueous solutions) are added, wherein the pH drops to 0.3. A pH>4 is achieved by adding of 170 g of NaOH (25 wt. %). At almost constant pH, 2 g of aluminum nitrate (in water) and 1.7 g of sodium perborate (97%) (in water) are added while maintaining the pH below 5 using NaOH (5 wt. %).

The resulting suspension is then heated to 95° C. while maintaining pH 4.7. After about 60 min the suspension turns deep yellow, and the pH briskly rises to 7. The suspension is stirred at 95° C. to constant pH for 80 min and then cooled to room temperature. The product is treated in the same way as Example 1.

Example 4

A mixture of 1000 g of water and 297 g of $NaVO_3$ (7 wt. % of V) is provided with stirring and cooling (8° C.). 21 g of $HNO_3$ (65 wt. %) and 7g of $H_3PO_4$ (85 wt. % strength) are added within 5 min. 351 g of an acidic bismuth nitrate solution (23.75 wt. % of Bi) are added to the mixture within 60 min wherein the pH drops to 0.5 and a beige suspension is obtained.

A solution of 1.54 g of $Ca(OH)_2$ (96%) in 24 g of water and a solution of 0.4 g of MgO (100%) in 34 g of water are then added within 15 min. The pH is increased to above 4.5 using 170 g of an aqueous NaOH solution (25 wt. %) within 1.5 hours and then maintained at 4.6 using NaOH (5 wt. %).

A solution of 4 g of $Al(NO_3)_3.9H_2O$ (98%) in 33 g of water and a solution of 3 g of sodium perborate (97%) in 29 g of water are added within 5 min. The mixture is heated at 95° C. for 80 min while maintaining a constant pH and then cooled to room temperature. The product is treated in the same way as Example 1.

Example 5

A mixture of 840 g of water, 297 g of aqueous sodium vanadate solution (7 wt. % of V), 16 g of $HNO_3$ (65 wt. %) and 5 g of $H_3PO_4$ (85 wt. %) is provided with stirring. The mixture is cooled to 8° C., and the pH decreased to 6.8 after about 5 min. 352 g of an acidic bismuth nitrate solution (23.75 wt. % of Bi) are added to the mixture within 60 min, the pH drops to 0.3 giving a beige suspension. A solution of 0.4 g of MgO (100%) in 34 g of water is added within 15 min. The pH is adjusted to above 4 using 170 g of an aqueous NaOH solution (25 wt. %) within 1.5 hours and then maintained at 4.6 using NaOH (5 wt. %).

A solution of 4 g of $Al(NO_3)_3.9H_2O$ (98%) in 33 g of water, and a solution of 3 g of sodium perborate (97%) in 29 g of water are then added within 5 min. The mixture is heated at 95° C. for 83 min while maintaining a constant pH and then cooled to room temperature. Any pH changes are adjusted using NaOH (5 wt. %). The yellow product is filtered, washed, dried and the resulting filter cake is processed in two different ways.

(a) A part of the filter cake is wet-milled in water to a particle size of about 1.24 μm and dried at 115° C., followed by calcination at 550° C. for 1 hour and wet-milling again to a particle size of about 0.9 μm.

(b) The second part is directly calcined at 550° C. for 1 hour, then wet-milled in water to a particle size of about 0.8 μm followed by drying at 110° C. in a through air circulation oven.

Example 6

A suspension of 264 g of $NaVO_3$ (7 wt. % of V) in 1000 g of $H_2O$ is cooled to 8° C. with stirring. A solution of 135 g of zirconium oxynitrate pentahydrate ($ZrO(NO_3)_2.5H_2O$) (27.2 wt. % of Zr) is added within 10 min while stirring, leading to an orange suspension. 16 g of $HNO_3$ (65 wt. %) and 7 g of $H_3PO_4$ (85 wt. %) are added within 5 min and the resulting mixture is stirred for 30 min. 176 g of an acidic bismuth nitrate solution (23.75 wt. % of Bi) and 478 g of an aqueous solution of cerium carbonate ($Ce_2(CO_3)_3.H_2O$) (10 wt. % of Ce) are added within 60 min, while stirring, the pH drops to 0.5, and a yellow suspension is formed after about 30 min.

A solution of 1.5 g of $Ca(OH)_2$ (≥96%) in 24 g of water and a solution of 0.4 g of MgO (100%) in 34 g of water are added within 15 min. The pH is adjusted to 4.7 using 170 g of an aqueous NaOH solution (25 wt. %) within 90 minutes and is then kept at above 4.6 using NaOH (5 wt. %). A solution of 4 g of $Al(NO_3)_3.9H_2O$ (98%) in 30 g of water and a solution of 3 g of sodium perborate (97%) in 29 g of water are added within 10 min. The mixture is then heated at 90° C. for 80 min while maintaining a constant pH and then cooled to room temperature. The yellow pigment is treated in the same way as Example 1.

The pigment shows a ΔE of 2.1 after 2374 hours of accelerated weathering.

Example 7

A suspension of 264 g of $NaVO_3$ (7 wt. % of V) in 1000 g of water is cooled to 8° C. A solution of 135 g of zirconium oxynitrate pentahydrate (27.2 wt. % of Zr) is added within 10 min while stirring. 16 g of $HNO_3$ (65 wt. %) and 7 g of $H_3PO_4$ (85 wt. %) are added after 5 min of stirring, the pH drops to 6.5. 316 g of an acidic bismuth nitrate solution (23.75 wt. % of Bi) and 102 g of an aqueous solution of vanadium (IV) oxide sulphate pentahydrate ($VOSO_{4.5}H_2O$) (10 wt. % of V) are added within 60 min while stirring, the pH drops to 0.3, and a yellow suspension is formed after about 30 min.

A solution of 0.8 g of $Ca(OH)_2$ (≥96%) in 24 g of water and a solution of 0.2 g of MgO (100%) in 34 g of water are added within 15 min. The pH is adjusted to 4.8 using 185 g of an aqueous NaOH solution (25 wt. %) within 90 min and then kept at above 4.6 using NaOH (5 wt. %). A solution of 2 g of $Al(NO_3)_3.9H_2O$ (98%) in 33 g of water and a solution of 1.6 g of sodium perborate (97%) in 29 g of water are added within 10 min. The mixture is heated at 95° C. for 80 min while maintaining a constant pH. Any pH changes are adjusted using NaOH (5 wt. %).

A part of the filter cake (a) is calcined at 550° C. for 1 hour and then wet-milled in water to a particle size of about 0.9 μm. The second part (b) is wet-milled in water to a particle size of about 1 μm and then dried, followed by calcining at 550° C. for 1 hour, wet-milling in water to a particle size of about 0.9 μm and drying at 110° C.

Example 8

A suspension of 880 g of water and 294 g of an aqueous $NaVO_3$ solution (6.95 wt. % of V) is stirred for 30 min. 135 g of an aqueous solution of zirconium oxynitrate pentahydrate (27.2 wt. % of Zr) is added within 10 min while stirring, wherein an orange suspension is formed at pH 9.4. The mixture is cooled with ice cooling and 16 g of $HNO_3$ (65 wt. %) are added, followed by adding 7 g of $H_3PO_4$ (85 wt. %) after 5 min at pH of about 6.9. 7 g of an aqueous $Na_2CO_3$ solution (15 wt. %) and 101 g of $HNO_3$ (65 wt. %) are used within 20 min to stabilise the pH at 7. 316 g of an acidic bismuth nitrate solution (23.75 wt. % of Bi) and 78 g of an aqueous solution of sodium molybdate ($Na_2MoO_4.2H_2O$) (10 wt. % Mo) are added within 60 min while stirring, the pH drops to 0.5, and a yellow suspension is formed after 30 min.

A solution of 0.8 g of $Ca(OH)_2$ (≥96%) in 24 g of water and a solution of 0.2 g of MgO (100%) in 34 g of water are added within 15 min. The pH is adjusted to above 4 using 195 g of an aqueous NaOH solution (25 wt. %) within 90 min and then maintained at above 4.5 using NaOH (5 wt. %).

A solution of 2 g of $Al(NO_3)_3.9H_2O$ (98%) in 33 g of water and a solution of 1.6 g of sodium perborate (97%) in 29 g of water are added, and the pH increases to 4.6. The mixture is heated at 95° C. for 80 min while maintaining a constant pH using NaOH (5 wt. %) and then cooled to room temperature. The resulting yellow suspension is filtered, the solid is washed, wet-milled in water to a particle size of about 1 μm and dried at 110° C.

A part of the product is calcined at 500° C. (a) and the second part is calcined at 550° C. (b). Each sample is then wet-milled to a particle size of about 0.7 μm and dried at 110° C. for 1 hour in a through air circulation oven.

Example 9

A suspension of 880 g of $H_2O$, and 296 g of an aqueous $NaVO_3$ solution (6.95 wt. % of V) is stirred for 30 min. 16 g of $HNO_3$ (65 wt. %) are added under ice cooling giving a pH of 8.9. 14 g of $H_3PO_4$ (85 wt %) are added within 5 min at a temperature of below 8° C. 352 g of an acidic bismuth nitrate solution (23.75 wt. % of Bi) are added to the mixture within 60 min and the pH drops to 0.5, which is increased to 4.6 using 210 g of $Na_2CO_3$ (15 wt. %) within 90 min. A solution of 3.1 g of $Ca(OH)_2$ (≥96%) in 24 g of water and a solution of 0.8 g of MgO (100%) in 34 g of water are added within 15 min, giving a pH of 0.5. The pH is increased to 4.7 using 170 g of NaOH (25 wt. %) within 90 min and then maintained at above 4.6 using NaOH (5 wt. %).

A solution of 8 g of $Al(NO_3)_3.9H_2O$ (98%) in 33 g of water and 7 g of sodium perborate (97%) in 29 g of water are then added decreasing the pH to 3.9. The mixture is heated at 95° C. for 80 min while maintaining a constant pH and then cooled to room temperature. The product is treated in the same way as Example 1.

Example 10

A suspension of 297 g of an aqueous $NaVO_3$ solution (7 wt. %) in 880 g of water is stirred for 30 min. 21 g of $HNO_3$ (65 wt. %) are added under ice cooling. 7 g of $H_3PO_4$ (85 wt. %) are added within 5 min at a temperature of below 8° C. 351 g of an acidic bismuth nitrate solution (23.75 wt. % of Bi) are added to the mixture within 60 min, and the pH drops to 0.3, which is increased to 4.6 using 150 g of $Na2CO_3$ (15 wt. %) within 90 min.

A solution of 1.5 g of $Ca(OH)_2$ (≥96%) in 24 g of water and a solution of 0.8 g of MgO (100%) in 34 g of water are added within 15 min giving a pH of 0.5. The pH is increased to 4.6 using 180 g of NaOH (25 wt. %) within 90 min and then maintained at above 4.6 using NaOH (5 wt. %).

A solution of 4 g of $Al(NO_3)_3.9H_2O$ (98%) in 33 g of water and a solution of 3.2 g of sodium perborate (97%) in 29 g of water are then added decreasing the pH to 3.9, which is increased to 4.7 using NaOH (5 wt. %). The mixture is heated at 95° C. for 80 min, while maintaining a constant pH and then cooled to room temperature. The resulting yellow product is filtered, washed and wet-milled in water to a particle size of about 1.5 μm. The pigment is then dried at 110° C. for 1 hour and then calcined at 550° C. for 1 hour followed by wet-milling in water to a final particle size of about 0.7 μm.

Example 11

A mixture of 1000 g of water and 264 g of an aqueous $NaVO_3$ solution (7 wt. % of V) is cooled to 8° C. with stirring. 135 g of an aqueous solution of zirconium oxynitrate pentahydrate (27.2 wt. % of Zr) is added within 10 min while stirring leading to an orange suspension at pH 9.4. 16 g of $HNO_3$ (65 wt. %) and 7 g of $H_3PO_4$ (85 wt. %) are added within 10 min wherein the pH decreased to 6.8 after about 5 min. 316 g of an acidic bismuth nitrate solution (23.75 wt. % of Bi) and 78 g of an aqueous sodium molybdate solution (10 wt. % of Mo) are added within 60 min while stirring, and the pH drops to 0.5 and a yellow suspension is formed after about 30 min.

A solution of 0.8 g of $Ca(OH)_2$. (≥96%) in 24 g of water and a solution of 0.2 g of MgO (100%) in 34 g of water are added within 15 min, and the pH is adjusted to above 4.5 using 165 g of an aqueous NaOH (25 wt. %) within 90 min and then maintained at above 4.6 using NaOH (5 wt. %). A solution of 1.9 g of $Al(NO_3)_3.9H_2O$ (98%) in 33 g of water, and a solution of 1.6 g of sodium perborate (97%) in 29 g of water are added. The mixture is heated at 95° C. for 80 min, while maintaining a constant pH (about 4.7) and then cooled to room temperature. The yellow product is filtered, washed and dried at 110° C. in a through air circulation for 1 hour followed by calcining at 550° C. and then wet-milling in water to a particle size of about 0.9 μm.

Example 12

A suspension of 1000 g of water and 297 g of an aqueous $NaVO_3$ solution (7 wt. % of V) is cooled to 8° C. with stirring. 16 g of $HNO_3$ (65 wt. %) and 7 g of $H_3PO_4$ (85 wt. %) are added within 5 min. 352 g of an acidic bismuth nitrate solution (23.75 wt. % of Bi) is added within 60 min and the pH drops to 0.3, which is adjusted to 4.5 using 150 g of $Na_2CO_3$ (15 wt. %) within 90 min. A solution of 1.5 g of $Ca(OH)_2$(≥96%) in 24 g of water and a solution of 0.4 g of MgO (100%) in of 34 g of water are added within 15 min giving a pH of 0.5. The pH is adjusted to 4.5 using 170 g of NaOH (25 wt. %) within 90 min and then maintained at above 4.5 using NaOH (5 wt. %).

A solution of 4 g of $Al(NO_3)_3.9H_2O$ (98%) in 33 g of water and a solution of 7 g sodium perborate (97%) in 29 g of water are then added decreasing the pH to 3.9. The mixture is heated at 95° C. for 80 min, while maintaining a constant pH and then cooled to room temperature. The yellow product is filtered, washed, wet-milled in water to a particle size of about 1.5 μm, dried at 110° C. in a through-circulation drying oven for 1 hour followed by calcining at 550° C. and wet-milling to a final particle size of about 0.7 μm. The pigment shows a ΔE of 1.8 after 4000 hours of accelerated weathering.

Example 13

A suspension of 840 g of water and 296 g of an aqueous NaVO$_3$ solution (6.95 wt. % of V) is stirred for 30 min with stirring at 8° C. 16 g of HNO$_3$ (65 wt. %) are added followed by 7 g of H$_3$PO$_4$ (85 wt. %) within 5 min. 352 g of an acidic bismuth nitrate solution (23.75 wt. % of Bi) is added to the mixture within 60 min, and the pH drops to 0.3. A solution of 1.2 g of MgO (100%) in 34 g of water is added within 15 min. The pH is adjusted to 4.5 using 189 g of NaOH (25 wt. %) within 2 hours and then maintained at above 4.7 using NaOH (5 wt. %).

A solution of 4 g of Al(NO$_3$)$_3$.9H$_2$O (98%) in 33 g of water and a solution of 3 g of sodium perborate (97%) in 29 g of water are added within 10 min. The mixture is then heated at 90° C. for 80 min while maintaining a constant pH and then cooled to room temperature. The yellow product is filtered, washed and dried at 110° C. The filter cake is processed in two ways:

A part (a) is calcined at 550° C. and then wet-milled in water to a particle size of about 0.9 µm. The second part (b) is first wet-milled in water to a particle size of about 1.6 µm, filtered, dried at 110° C. for 1 hour and then calcined at 550° C. followed by wet-milling in water to a final particle size of about 0.7 µm.

Example 14

A suspension of 1000 g of water and 302 g of an aqueous NaVO$_3$ solution (7 wt. % of V) is stirred at 8° C. while stirring. 16 g of HNO$_3$ (65 wt. %) and 7 g of H$_3$PO$_4$ (85 wt. %) are added within 5 min.

352 g of an acidic bismuth nitrate solution (23.75 wt. % of Bi) is added to the mixture within 60 min, and the pH drops to 0.4, which is adjusted to 4.5 using 150 g of Na$_2$CO$_3$ (15 wt. %) within 90 min. A solution of 1.5 g of Ca(OH)$_2$ (≥96%) in 24 g of water and a solution of 0.4 g of MgO (100%) in 34 g of water is added within 15 min giving a pH of 0.5. The pH is adjusted to 4.5 using 185 g of NaOH (25 wt. %) within 90 min and then maintained at above 4.6 using NaOH (5 wt. %).

A solution of 4 g of Al(NO$_3$)$_3$.9H$_2$O (98%) in 33 g of water and a solution of 3 g of sodium perborate (97%) in 29 g of water are added within 10 min. The mixture is then heated at 90° C. for 80 min while maintaining a constant pH and then cooled to room temperature. The yellow product is filtered, washed and dried at 110° C. The filter cake is processed in two ways:

A part (a) is calcined at 500° C. and then wet-milled in water to a particle size of about 0.9 µm. The second part (b) is first wet-milled in water to a particle size of about 1.2 µm, filtered, dried at 110° C. for 1 hour and then calcined at 550° C. followed by wet-milling in water to a final particle size of about 0.7 µm.

Both pigments show a ΔE of 1.9 after 2374 hours of accelerated weathering.

Example 15

A mixture of 1000 g of water and 296 g of an aqueous NaVO$_3$ solution (7 wt. % of V) is cooled to 8° C. with stirring. 21 g of HNO$_3$ (65 wt. %) and 7 g of H$_3$PO$_4$ (85 wt. %) are added within 10 min, wherein the pH decreased to 6.5 after about 5 min. 27 g of an aqueous solution of zirconium oxynitrate pentahydrate (27.2 wt. % of Zr) is added within 10 min while stirring leading to an orange suspension at pH 6.9. 281 g of an acidic bismuth nitrate solution (23.75 wt. % of Bi) are added within 60 min while stirring, and the pH drops to 0.4 and a yellow suspension is formed after about 30 min.

A solution of 0.4 g of MgO (100%) in 34 g of water is added within 15 min, and the pH is adjusted to above 4.5 using 144 g of an aqueous NaOH (25 wt. %) within 90 min and then maintained at above 4.6 using NaOH (5 wt. %).

A solution of 3.8 g of Al(NO$_3$)$_3$.9H$_2$O (98%) in 33 g of water and a solution of 3.2 g of sodium perborate (97%) in 29 g of water are added. The mixture is heated at 95° C. for 80 min, while maintaining a constant pH and then cooled to room temperature. The yellow product is filtered, washed and dried at 110° C. in a through air circulation for 1 hour followed by calcining at 550° C. and then wet-milling in water to a particle size of about 0.9 µm.

TABLE 1

| Ex | h | C* | L* | Color strength* | Weathering test |
|---|---|---|---|---|---|
| 1 | 91.42 | 106.4 | 89.51 | | 4-5 |
| 2 | 91.19 | 105.12 | 89.33 | | 4-5 |
| 3 | 92.67 | 105.02 | 90.61 | | 4-5 |
| 4 | 91.61 | 105.98 | 89.74 | 121.7 | 4-5 |
| 5a | 92.57 | 105.24 | 87.75 | | 4-5 |
| 5b | 92.66 | 105.07 | 86.67 | | 4-5 |
| 6 | 92.68 | 104.87 | 90.08 | 125.2 | 4-5 |
| 7a | 88.06 | 102.3 | 83.66 | | 3-4 |
| 7b | 88.42 | 101.6 | 83.74 | | 3-4 |
| 8a | 92.18 | 104.2 | 90.03 | | 4-5 |
| 8b | 91.75 | 104.6 | 89.23 | | 4-5 |
| 9 | 91.3 | 106.51 | 88.88 | | 4-5 |
| 10 | 92.16 | 105.77 | 88.35 | | 4-5 |
| 11 | 91.96 | 103.3 | 87.44 | 124.7 | 3-4 |
| 12 | 91.71 | 104.98 | 88.55 | | 5 |
| 13a | 92.74 | 105.04 | 88.17 | | 4-5 |
| 13b | 92.68 | 105.14 | 87.84 | | 4-5 |
| 14a | 92.20 | 105.62 | 88.12 | | 5 |
| 14b | 92.52 | 105.28 | 88.03 | | 5 |
| 15 | 91.96 | 104.3 | 90.44 | 126.7 | 4-5 |

*Color strength measured related to reference Sicopal L1100 (=100)

The invention claimed is:

1. A bismuth vanadate pigment of formula $$\text{Bi Mg}_a \text{Al}_b \text{E}_c \text{V}_d \text{P}_e \text{O}_f \qquad (I)$$

wherein E is selected from the group consisting of Ca, Sr, Ba, Zr, Mo, Ce and a combination thereof;
0.001≤a≤0.2;
0.001≤b≤0.2;
0≤c≤1.7;
0.5≤d≤2.3;
0.001≤e≤0.5; and
f denotes the number of oxygen atoms for satisfying the valence requirements of the cations.

2. The bismuth vanadate pigment according to claim 1, wherein 0.001≤a≤0.15; 0.001≤b≤0.15; 0≤c≤1.5; 0.8≤d≤2.3; and 0.01≤e≤0.4.

3. The bismuth vanadate pigment according to claim 1, wherein
E is selected from the group consisting of Ca, Zr, Mo, Ce and a combination thereof; and
0.001≤c≤1.5.

4. The bismuth vanadate pigment according to claim 1, wherein
E is selected from the group consisting of Ca, Zr, Mo and a combination thereof;
0.001≤c≤0.5 and 0.8≤d≤1.5.

5. The pigment according to claim 1, wherein
E is Ca and/or Zr; and
$0.001 \leq c \leq 0.5$.

6. The pigment according to claim 1, wherein
E is Ca and/or Zr; and
$0.01 \leq c \leq 0.5$.

7. The pigment according to claim 1, wherein
E is Zr and Mo;
$0.001 \leq a \leq 0.15$; $0.001 \leq b \leq 0.15$; $0.01 \leq c \leq 0.5$; $0.8 \leq d \leq 1.5$; and $0.01 \leq e \leq 0.4$.

8. The pigment according to claim 1, wherein
E is Ce or a combination of Zr and Ce or a combination of Ca and Ce;
$0.001 \leq a \leq 0.15$; $0.001 \leq b \leq 0.15$; $0.01 \leq c \leq 1.5$; $0.8 \leq d \leq 2.3$; and $0.01 \leq e \leq 0.4$.

9. The pigment according to claim 1, wherein
E is a combination of Ca, Zr and Ce;
$0.001 \leq a \leq 0.15$; $0.001 \leq b \leq 0.15$; $0.01 \leq c \leq 1.5$; $0.8 \leq d \leq 2.3$; and $0.01 \leq e \leq 0.4$.

10. The pigment according to claim 1, wherein
E is a combination of Ca, Zr and Mo;
$0.001 \leq a \leq 0.15$; $0.001 \leq b \leq 0.15$; $0.01 \leq c \leq 0.5$; $0.8 \ 5 \leq d \leq 1.5$; and $0.01 \leq e \leq 0.4$.

11. The pigment according to claim 1, wherein c is 0;
$0.001 \leq a \leq 0.15$; $0.001 \leq b \leq 0.15$; $0.8 \leq d \leq 1.5$; and $0.01 \leq e \leq 0.4$.

12. The pigment according to claim 1, wherein vanadium is present as V(V) and V(IV) in a molar ratio of from 1:0.01 to 1:0.3.

13. A process of manufacturing the bismuth vanadate pigment of formula (I) as defined in claim 1, which process comprises the steps of
   a) treating an alkaline vanadate solution with an acidic bismuth salt solution in the presence of soluble salts of Mg, Al, and optionally of E and/or V(IV), and soluble phosphates in a pH range of from 0.1 to 10 to form a precipitate,
   b) calcining the precipitate, and
   c) grinding to form pigment particles.

14. A coating composition, a paint, a printing ink, a liquid ink, plastics, a film, a fiber, a glaze for ceramics or glass, which is colored with the pigment as defined in claim 1.

15. A process for coloring a coating compositions, a paint, a printing ink, a liquid ink, plastics, a film, a fiber, a glaze for ceramics or glass, which process comprises adding thereto the pigment as defined in claim 1.

16. The pigment according to claim 1, wherein $0.001 \leq b \leq 0.15$.

17. The pigment according to claim 1, wherein $0.005 \leq b \leq 0.12$.

18. The pigment according to claim 1, wherein $0.005 \leq a \leq 0.12$; $0.005 \leq b \leq 0.12$; $0.01 \leq c \leq 1.5$; $0.85 \leq d \leq 2.2$; and $0.01 \leq e \leq 0.4$.

19. The pigment according to claim 1, wherein
E is Ca and Zr; and
$0.001 \leq c \leq 0.5$.

* * * * *